United States Patent
Tcha et al.

(10) Patent No.: US 9,451,021 B2
(45) Date of Patent: Sep. 20, 2016

(54) SYSTEM AND METHOD FOR PROVIDING CONTENT-CENTRIC SERVICES USING ULTRA-PEER

(75) Inventors: Yongjoo Tcha, Seongnam-si (KR); Seong-Choon Lee, Seoul (KR)

(73) Assignee: KT Corporation, Seongnam (KR)

( * ) Notice: Subject to any disclaimer, the term of this patent is extended or adjusted under 35 U.S.C. 154(b) by 665 days.

(21) Appl. No.: 13/313,551

(22) Filed: Dec. 7, 2011

(65) Prior Publication Data

US 2012/0150945 A1    Jun. 14, 2012

(30) Foreign Application Priority Data

Dec. 8, 2010 (KR) ........................ 10-2010-0125084

(51) Int. Cl.
*H04L 29/08* (2006.01)
*G06F 15/16* (2006.01)

(52) U.S. Cl.
CPC ....... *H04L 67/1063* (2013.01); *H04L 67/1074* (2013.01); *H04L 67/1089* (2013.01); *H04L 67/1093* (2013.01)

(58) Field of Classification Search
CPC .......... H04L 67/1063; H04L 67/1074; H04L 67/1089; H04L 67/1093; H04L 67/1095; H04L 67/1097; H04L 67/104; H04L 67/1002; H04L 67/10; H04L 67/1061; H04L 67/1065; H04L 67/1068; H04L 67/107; H04L 67/1072; H04L 67/2804; H04L 67/2814; H04L 67/28; H04L 67/26; G06F 17/30; G06F 17/30011; G06F 17/30017; G06F 17/30241
USPC ....... 709/201, 202, 203, 204, 205, 206, 214, 709/217, 218, 219, 225, 226, 227, 228, 229, 709/238, 239, 245, 246; 707/999.01, 661, 707/770, 827, 916, 999.001, 999.1, 707/999.104, 999.204, E17.044, E17.001, 707/E17.005, E17.008, E17.009, E17.01, 707/E17.032, E17.059, E17.102, E17.121, 707/E17.143

See application file for complete search history.

(56) References Cited

U.S. PATENT DOCUMENTS

| | | | | |
|---|---|---|---|---|
| 7,277,896 | B2 * | 10/2007 | Matsubara et al. | 709/203 |
| 7,970,868 | B2 * | 6/2011 | Garg et al. | 709/219 |
| 8,341,124 | B2 * | 12/2012 | Kinoshita et al. | 707/661 |
| 8,515,991 | B2 * | 8/2013 | Sato | 707/770 |
| 2005/0289237 | A1 * | 12/2005 | Matsubara et al. | 709/232 |
| 2006/0059248 | A1 * | 3/2006 | Ikeda | 709/219 |

(Continued)

FOREIGN PATENT DOCUMENTS

| KR | 1020040074403 A | 8/2004 |
|---|---|---|
| KR | 1020090076719 A | 7/2009 |

(Continued)

*Primary Examiner* — Saket K Daftuar
(74) *Attorney, Agent, or Firm* — Sughrue Mion, PLLC (57) ABSTRACT

To provide a content provision service to a user in conjunction with an end terminal and a P2P management server, a request for content is received based on a content name input from a user. It is checked whether the content corresponding to the content name is stored or not, and if the content is not stored, the content name is transmitted to the P2P management server to request content location information. Upon receiving the content location information from the P2P management server, a request for the content is sent to an adjacent content providing device listed in the content location information. Then, the content is received from the adjacent content providing device and provided to the user.

5 Claims, 5 Drawing Sheets

(56) References Cited

U.S. PATENT DOCUMENTS

| | | | |
|---|---|---|---|
| 2006/0064466 A1* | 3/2006 | Shiga et al. | 709/214 |
| 2006/0165014 A1* | 7/2006 | Ikeda | 370/254 |
| 2007/0220430 A1* | 9/2007 | Sato | 715/716 |
| 2007/0233704 A1* | 10/2007 | Shiga et al. | 707/10 |
| 2008/0147821 A1* | 6/2008 | Dietrich et al. | 709/216 |
| 2008/0270538 A1* | 10/2008 | Garg et al. | 709/204 |
| 2009/0054089 A1* | 2/2009 | Tsurukiri et al. | 455/466 |
| 2010/0121821 A1* | 5/2010 | Kinoshita et al. | 707/661 |
| 2010/0306339 A1* | 12/2010 | Ling et al. | 709/213 |

FOREIGN PATENT DOCUMENTS

| | | |
|---|---|---|
| KR | 10-2009-0130615 A | 12/2009 |
| KR | 1020100020912 A | 2/2010 |

* cited by examiner

SYSTEM AND METHOD FOR PROVIDING CONTENT-CENTRIC SERVICES USING ULTRA-PEER

CROSS-REFERENCE TO RELATED APPLICATION

This application claims priority to and the benefit of Korean Patent Application No. 10-2010-0125084 filed in the Korean Intellectual Property Office on Dec. 8, 2010, the entire contents of which are incorporated herein by reference.

BACKGROUND OF THE INVENTION (a) Field of the Invention

The present invention relates to a system and method for providing content-centric services using an ultra-peer.

(b) Description of the Related Art

With the growing number of smartphone users in the mobile communications market, wireless data traffic has been increasing exponentially. Moreover, as the smartphones' performance shows improvement, a wide variety of application services have been introduced. Especially, the demand for large volumes of multimedia traffic is increasing. That is, the increasing spread of smartphones will observe the installation of a wide variety of applications installed on smartphones, and therefore P2P clients are expected to increase.

However, the current common P2P technology has the problem that it is difficult to apply wired P2P as it is to a wireless network because terminals in the wireless network show low performance due to large performance deviation, unlike terminals in a wired network. Moreover, it is impossible to apply the wired P2P to a wireless network since the terminal status changes often, the wireless network incurs high cost, and the transfer rate is low and unstable compared to the wired network.

Accordingly, P2P of a wireless network introduces the concept of a super peer functioning in place of a mobile peer in order to overcome the aforementioned problems. Nevertheless, the super peer is only used as a mere substrate for the mobile peer.

In general, content transmission includes a broadcast technique for transmitting content to all recipients, a multicast technique for transmitting content to specific recipients who subscribed to a service, and a unitcast technique for transmitting content selectively to each recipient. Among them, the broadcast technique uses a single predetermined address, while the multicast technique uses an IP address for each group.

By the way, such an address is not specific for content, but used to differentiate recipients. Moreover, an IP address used for unicast is a host IP of a recipient, which is routed to a destination. Hence, an IP address does not represent content, and therefore inefficient in such environments as smart TVs targeted for content transmission.

That is, the same data is transmitted to different IP addresses, so the load on a server due to redundant transmissions may increase. Further, the amount of traffic on a network may increase because of redundant content transmissions.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for providing content-centric services using an ultrapeer having the advantage of efficiently transmitting large volumes of content repeatedly transmitted more than necessary on a network through a distributed transmission technology based on P2P and a content-based transmission technology.

An exemplary embodiment of the present invention provides a system for providing a content service to a user in conjunction with an end terminal and a P2P management server, the system including:

a content storage unit that receives content from the end terminal and stores the content together with the content name, and, upon receipt of the content name, searches the content corresponding to the content name and provides the same; a content request collection unit that collects a content name in response to a content request from the end terminal, and, upon receiving a content location provision message from the P2P management server, reports the same to the content storage unit; a content name creation unit that creates a name for the content delivered from the end terminal; and a P2P management server registration unit that reports the content name created by the content name creation unit to the P2P management server and registers the same.

Another embodiment of the present invention provides a P2P management server for providing a content service to a user in conjunction with an end terminal and a service providing device, the P2P management server including:

a content location provision unit that provides content location information indicative of the location of content requested by a service providing device to the service providing device to which a content-requesting end terminal is connected; a content information storage unit that stores content information received from the service providing device; and a content request reception unit that receives, from the service providing device that has requested the content, content search information associated with the content name and the ID of the service providing device that has requested the content; delivers the received content search information to the content information storage unit to inform the service providing device of the location of the corresponding content.

Yet another embodiment of the present invention provides a method for providing a content service to a user in conjunction with an end terminal and a service providing device, the method including:

receiving a request for content based on a content name input from a user; checking whether the content corresponding to the content name is stored or not; if the content is not stored, transmitting the content name to the P2P management server and requesting content location information; upon receiving the content location information from the P2P management server, sending a request for the content to an adjacent content providing device listed in the content location information; and receiving the content from the adjacent content providing device and providing the same to the user.

Still another embodiment of the present invention provides a method for providing a content service to a user in conjunction with an end terminal and a service providing device, the method including:

receiving a content location request message containing a content name from the service providing device; and creating a content location confirmation message containing the content name and the ID of the service providing device having the content corresponding to the content name and transmitting the same to the service providing device that has transmitted the content location request message.

According to an exemplary embodiment of the present invention, traffic can be properly distributed and stably provided in providing a large-volume multimedia service in a wireless environment.

Moreover, it is possible to provide content-centric services using a mobile P2P technology centered on a smart TV, such as a network-connected TV, a next-generation IPTV network environment, and a smartphone.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a terminal may designate a mobile station (MS), a terminal, a mobile terminal (MT), a subscriber station (SS), a portable subscriber station (PSS), user equipment (UE), an access terminal (AT), and so on. Moreover, the mobile peer node may include all or a part of functions of the mobile terminal, the subscriber station, the portable subscriber station, the user equipment, and so on.

In this specification, a base station (BS) may designate an access point (AP), a radio access station (RAS), a node B (Node B), an evolved node B (eNode B), a base transceiver station (BTS), a mobile multihop relay (MMR)-BS, and so on. Further, the base station may include all or a part of functions of the access point, the radio access station, the node B, the eNode B, the base transceiver station, the MMR-BS, and so on.

In line with the widespread use of IPTV, TVs are more like computers, being connected all the time to an IP network, and are expected to become more diverse in its functions. As evidenced by network-connected TVs (smart TVs), such as Google TV and Apple TV, introduced by companies like Google and Apple who provide services on the internet introduced, TVs will play a more important role from now on as means for providing various services, such as VoD, information search, and chat, being connected to the platform of a service provider, as well as simply displaying TV channels sent out from broadcasting stations. Also, P2P-based content provision services using these TVs are expected to be delivered.

An exemplary embodiment of the present invention will be described with respect to a method for providing a mobile P2P service using an ultrapeer, which will be explained with reference to the drawings.

Figure 1:
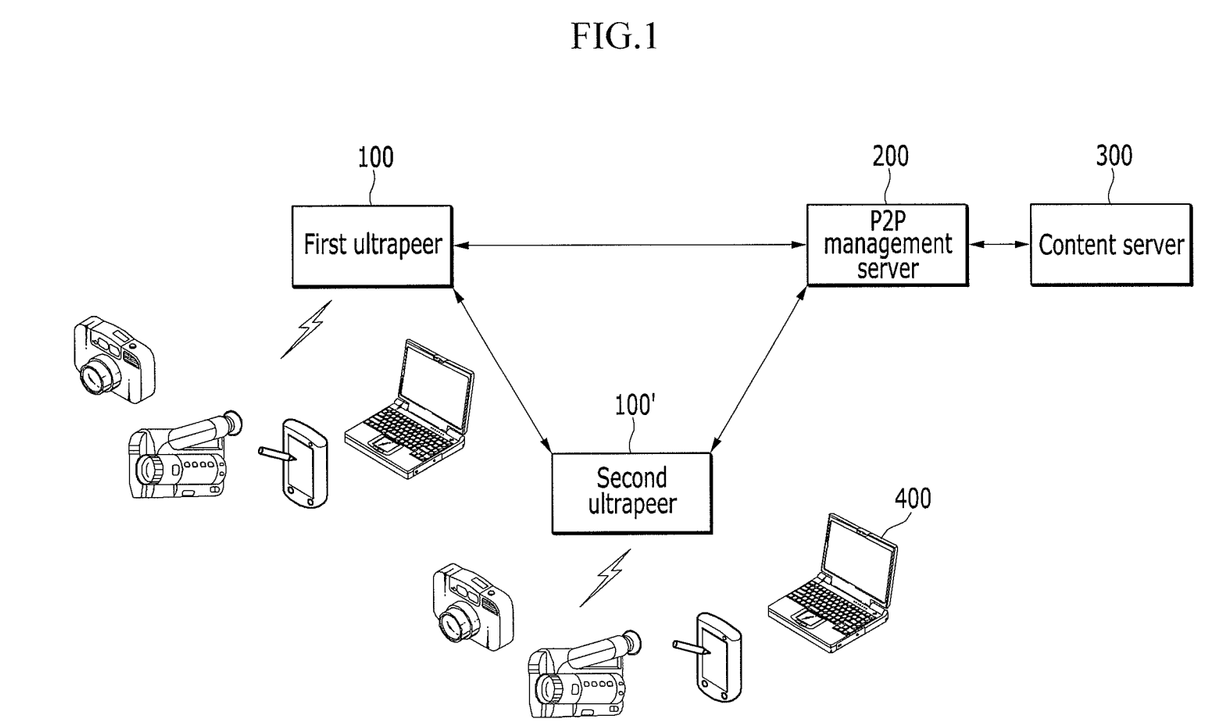
FIG. 1 is an illustration showing a system for providing services in a mobile P2P environment according to an exemplary embodiment of the present invention.

FIG. 1 is an illustration showing a system for providing services in a mobile P2P environment according to an exemplary embodiment of the present invention.

As shown in FIG. 1, a plurality of ultrapeers 100 and 100', which are service providing devices, operating in conjunction with a P2P management server 200 are present in a mobile P2P environment, i.e., service provision system, according to the exemplary embodiment of the present invention, and end terminals 400 are connected to each of the ultrapeers 100 and 100'. Moreover, the P2P management server 200 is connected to a content server 300. Various nodes (not shown) such as routers or switches are present between the ultrapeers 100 and 100' and the P2P management server 200.

Although the exemplary embodiment of the present invention will be described by taking a network-connectable TV as an example of the ultrapeers 100 and 100' serving as the service providing devices. In addition, the ultrapeers 100 and 100' provide content in such a way that users can watch content generated on the internet whenever they want to.

Moreover, the ultrapeers 100 and 100' can receive, from the end terminals 400 connected to them, content generated by the end terminals 400, and register the content in the P2P management server 200. Further, when a peripheral end terminal 400 connectable to the ultrapeer 100 wants to receive content, if the corresponding content is not stored in the ultrapeer 100, it can be downloaded from another ultrapeer 100' adjacent to the ultrapeer 100 and having the corresponding content, rather than receiving the content from the content server 300.

The end terminals 400 are connected to the ultrapeers 100 and 100' via various types of wireless networks, such as WiFi, WPAN, and Bluetooth, and can include cameras, camcorders, laptops, smartphones, etc.

In such an environment, the structure of the ultrapeers 100 and 100' that provide user-generated content and the structure of the P2P management server 200 will be described with reference to FIGS. 2 and 3.

Figure 2:
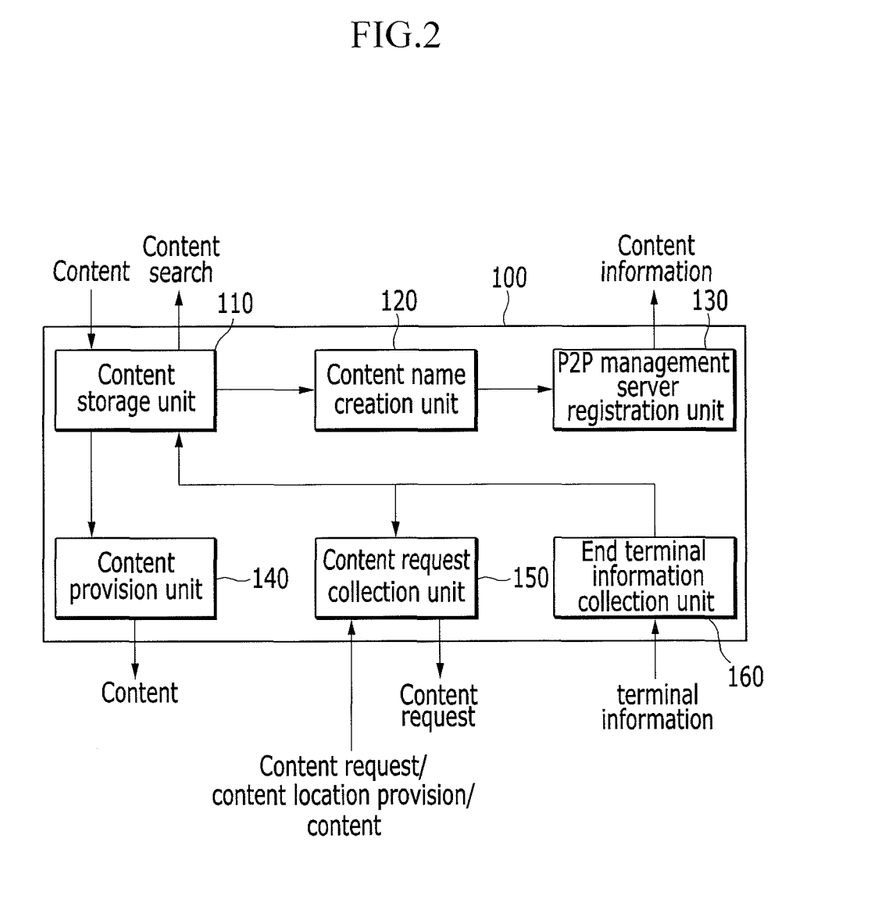
FIG. 2 is a view showing the structure of a system for providing services according to the exemplary embodiment of the present invention.

FIG. 2 is a view showing the structure of a system for providing services according to the exemplary embodiment of the present invention. FIG. 3 is a view showing the structure of a P2P management server according to the exemplary embodiment of the present invention.

First, as shown in FIG. 2, the ultrapeer 100, which is a service providing device according to an exemplary embodiment of the present invention, includes a content storage unit 110, a content name creation unit 120, a P2P management server registration unit 130, a content provision unit 140, a content request collection unit 150, and an end terminal information collection unit 160.

The content storage unit 110 receives content generated by an end terminal directly from the end terminal 400, such as a camera, camcorder, laptop, or smartphone, and stores it together with specific information specific of the end terminal 400 and collected by the end terminal information collection unit 160. Upon receiving content to be provided to the user from an adjacent ultrapeer 100, the ID of the ultrapeer 100 that has delivered the content is stored as well.

Moreover, when the content storage unit 110 receives, from the content request collection unit 150, the title of some content the user has requested, it determines whether the corresponding content is stored or not. If the content is not present, an adjacent ultrapeer 100' or the P2P management server 200 is requested to provide the corresponding content. In this case, the exemplary embodiment of the present invention will be described with respect to an example in which, if the user-requested content is not stored in the content storage unit 110, content information including the content name for the corresponding content and the ultrapeer ID is basically delivered to the P2P management server 200 to request the content location: however, the content storage unit 110 itself may make a request to the adjacent ultrapeer 100'.

The content name creation unit 120 creates a name for the content received from end terminal 400. The content name is created by combining the line number of the ultrapeer 100, the specific information of the end terminal 400, media type (e.g., video, music, photos, etc.), and the date of creation. The content name is created in such a manner that general users are sure to find out only by content name what type of content the corresponding content is.

The P2P management server registration unit 130 reports and registers the content name created by the content name creation unit 120 to the P2P management server 200. At this point, the unique ID of the ultrapeer 100 is also reported to the P2P management server 200 so that it can be stored as content information in the form of {content name and ultrapeer ID}. This is to enable the user to search content by content name, rather than by IP address or URL.

The content provision unit 140 receives user-requested content from the content storage unit 1110 and provides it. Otherwise, if the corresponding content is not present in the content storage unit 110, it is received from an adjacent ultrapeer 100' and provided to the user.

The content request collection unit 150 collects information regarding a content request from the end terminal 400, i.e., a content name, and reports it to the content storage unit 110 so that the corresponding content is provided to the user. Also, upon receiving, from the content storage unit 110, a signal indicating that the user-requested content is not stored, a content location information request is sent to the P2P management server registration unit 130. At this point, content location information containing the content name and the ultrapeer ID is delivered to the P2P management server 200.

Moreover, upon receiving the content location information from the P2P management server 200, the content request collection unit 150 reports the content name to an adjacent ultrapeer listed in the content location information and requests the adjacent ultrapeer to provide the content. Upon receiving the content from the adjacent ultrapeer, the content request collection unit 150 delivers the content to the content storage unit 110 so that the user can receive it.

Then, upon receiving the content information containing the content name and the ultrapeer ID from nodes (e.g., routers or switches) located at a higher level than ultrapeer 100, the content request collection unit 150 requests the corresponding ultrapeer to provide the content. The content associated with the content information received from a higher-level node is popular content that a large number of ultrapeers have, which means that there are a large number of users who request the corresponding content.

Accordingly, location information of the corresponding content can be obtained by seeing the content name at the higher-level node, without sending a content location information request to the P2P management server 200. To this end, description will be given on an example in which higher-level nodes of the ultrapeer 100 in the exemplary embodiment of the present invention include a cache function for managing a history of transmissions.

Upon receiving content from the end terminal 400, or when the end terminal 400 goes from the power-off state to the power-on state and becomes communicable with the ultrapeer 100, the end terminal information collection unit 160 collects terminal information containing specific information of the end terminal 400 (e.g., identifier information stored in the terminal). Moreover, the end terminal information collection unit 160 may collect the content information that the end terminal 400 has.

Figure 3:
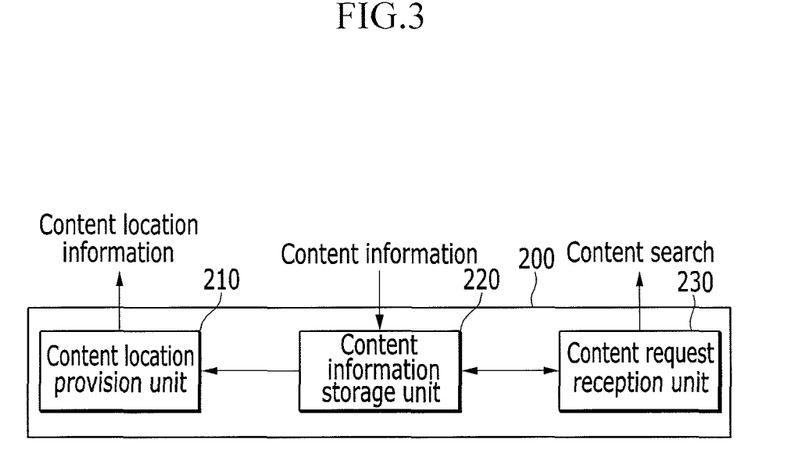
FIG. 3 is a view showing the structure of a P2P management server according to the exemplary embodiment of the present invention.

Meanwhile, as shown in FIG. 3, the P2P management server 200 connected to the ultrapeer 100 includes a content location provision unit 210, a content information storage unit 220, and a content request reception unit 230.

The content location provision unit 210 is the ultrapeer 100 to which the end terminal 400 that has sent a content provision request, and provides content location information indicating in which ultrapeer the content requested by the ultrapeer 100 is currently present. The content location information contains the ultrapeer ID and the content name. At this point, the priority of content can be checked in the content information storage unit 220. For low-priority content, only the content name is delivered to the ultrapeer 100. A description of content priority will be made later.

The content information storage unit 220 stores content information transmitted from a plurality of ultrapeers 100 and 100' connected to the P2P management server 200. At this point, the content information is stored in the form of {content name and ultrapeer ID}. Further, in addition to the content information, priority information of the corresponding content and IDs for respective nodes for different network structures are also included. And Ultrapeer ID means an identifier allocated to a router or switch present at a higher level than the ultrapeer 100.

If the number of ultrapeers having the content is large, the content is marked as low priority. In this case, the content location provision unit 210 provides only the content name. Meanwhile, in the case of little-known content or new content, the number of ultrapeers having such content is small. Thus, the content is marked as high priority. Also, the content location provision unit 210 provides ultrapeer IDs having the content, as well as the content name. There may be a number of methods for indicating priority, and the exemplary embodiment of the present invention is not limited to any of them.

The content request reception unit 230 receives, from a content-requesting ultrapeer 100, content search information associated with the content name and the ID of the content-requesting ultrapeer 100. The received content search information is delivered to the content information storage unit 220 so that the ultrapeer 100 is informed about the location of the corresponding content.

A method for providing content via the ultrapeer 100 serving as the above-described service providing device will be described with reference to FIGS. 4 and 5.

Figure 4:
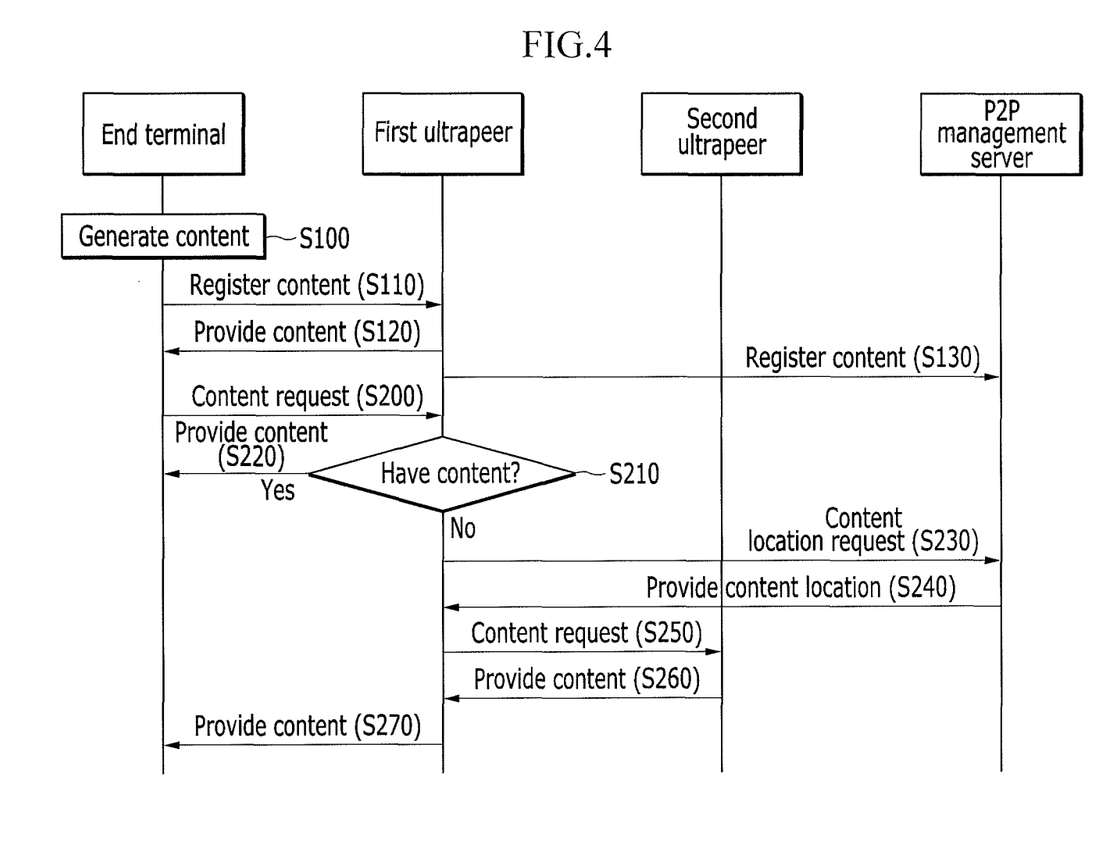
FIG. 4 is a flowchart showing a method for providing content in a hierarchical network configuration according to the exemplary embodiment of the present invention.

FIG. 4 is a flowchart showing a method for providing content in a hierarchical network configuration according to the exemplary embodiment of the present invention. FIG. 5 is an illustration showing P2P content transmission for the hierarchical network configuration according to the exemplary embodiment of the present invention. The description of FIG. 4 will be given by taking as an example transmission of content with high priority, and the description of FIG. 5 will be given by taking as an example transmission of content with low priority.

First, as shown in FIG. 4, the user generates content using an end terminal 400 (S100), and when the user wants to play the generated content on an ultrapeer, i.e., a smart TV, the end terminal 400 delivers the content generated in the step S100 to the ultrapeer so that the content is registered in the ultrapeer (S110). At this point, the ultrapeer to which the end terminal 400 is connected is called the first ultrapeer.

That is, the content name creation unit 120 of the first ultrapeer 100 creates the content name for the content received in the step S110 based on the content that the content storage unit 110 has received from the end terminal 400 and the terminal information of the end terminal 400 collected by the end terminal information collection unit 160. Then, the content provision unit 140 provides the content to the user (S120). Meanwhile, the P2P management server registration unit 130 delivers, to the P2P management server 200, content information containing the content name created by the content name creation unit 120 and the ID of the first ultrapeer 100 (S130) so that the information about the corresponding content is stored in the P2P management server 200.

In the steps S100 to S130, the content generated in the end terminal 400 is stored not only in the first ultrapeer 100, but also in the P2P management server 200 and used later.

Meanwhile, when the name of certain content is input in the end terminal 400 to send the first ultrapeer 100 a request for content provision (S200), the content storage unit 110 checks whether it has the content corresponding to the content name requested by the end terminal 400 (S210). If the content is stored in the content storage unit 110, the content provision unit 140 provides the corresponding content to the user (S220).

However, if the content corresponding to the content name is not present in the content storage unit 110, the content request collection unit 150 sends a content location information request to the P2P management server 200 (S230). As used herein, the content location information transmitted by the content request collection unit 150 contains the content name and the ID of the first ultrapeer 100 that has requested the content. Upon receiving a content location information request message from the content request collection unit 150, the content request reception unit 150 checks the content location information based on the content information stored in the content information storage unit 220, and delivers it to the content request collection unit 150 (S240).

At this point, provided that the content requested by the end terminal 400 is present in the second ultrapeer 100', the ID of the second ultrapeer 100' and the content name are included and transmitted in the content location provision message, which is delivered to the content request collection unit 150 in the step S240, according to the priority of the content. That is, the content location information message is provided to the content information storage unit 150 based on the priority levels classified according to the popularity of the corresponding content.

If the number of ultrapeers having the content is small, the priority becomes higher, and accordingly the content request collection unit 150 provides the first ultrapeer 100 with the ID of an ultrapeer having the corresponding content, along with the content name. As the description of FIG. 4 will be given by taking content with high priority as an example, the content location provision message delivered to the content request collection unit 150 includes the ID of an ultrapeer, as well as the content name.

Upon receiving the content location provision message, the content request collection unit 150 sends an adjacent second ultrapeer 100' a request for the corresponding content based on the information contained in the content location provision message (S250). That is, if the user-requested content is little known, this means that the content has high priority. Thus, the content location provision message to be transmitted includes the ID of the second ultrapeer 100' having the content, as well as the content name.

Accordingly, the content request collection unit 150 of the first ultrapeer 100 requests the content based on the ID of the second ultrapeer 100'. Upon receiving the content from the content storage unit 110 of the second ultrapeer 100' (S260), the first ultrapeer 100 provides the content to the user (S270). In the above-described procedure, transmission of popular content, i.e., content with low priority, will be described with reference to FIG. 5.

Figure 5:
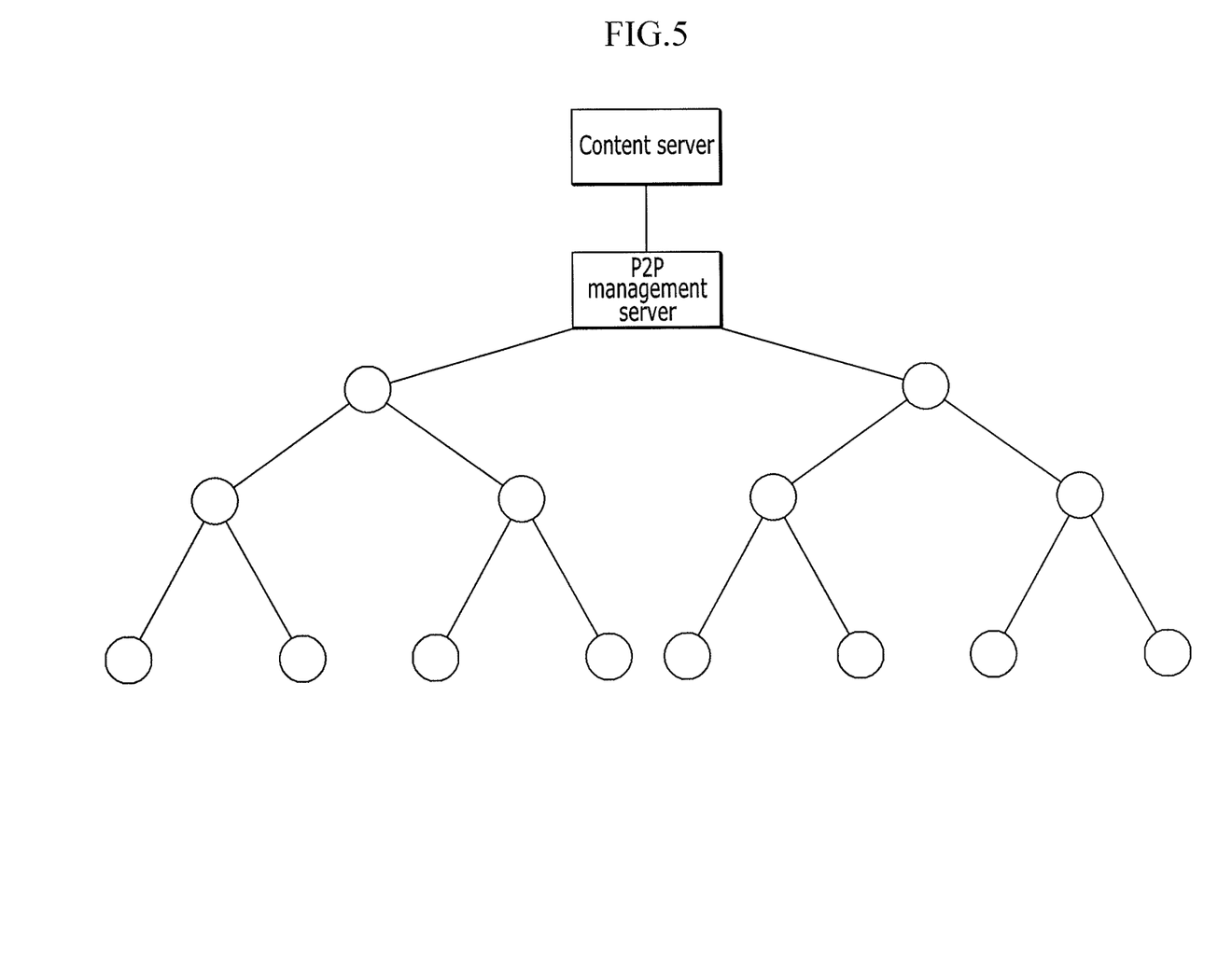
FIG. 5 is an illustration showing P2P content transmission for the hierarchical network configuration according to the exemplary embodiment of the present invention.

As shown in FIG. 5, if the user-requested content is not content managed by the ultrapeer 100, the content request collection unit 150 forwards a content location request message to the P2P management server 200. At this point, the message directed to the P2P management server 200 from the ultrapeer 100 is transmitted via a node (hereinafter, referred to as a higher-level node) present between the ultrapeer 100 and the P2P management server 200.

Therefore, as shown in FIG. 5, the number of requesting ultrapeers becomes higher for popular content, and hence any one of higher-level nodes has a history of transmission of the corresponding content to each higher-level node. The storing of a content transmission history in any one of higher-level nodes means that another ultrapeer in the direction of the ultrapeer has the corresponding content.

Therefore, even if the content location request message is not forwarded to the P2P management server 200, location information of the content can be received from any one of the higher-level nodes. As a result, the higher the number of content distributions, i.e., the number of IDs of ultrapeers, the better the content can be managed by the ID of a node which uses the corresponding ultrapeer ID as a lower-level interface, thereby reducing the load of the P2P management server 200.

The higher the number of ultrapeers having the content, the lower the priority. In this case, the content request collection unit 150 provides only the content name to the first ultrapeer 100 by means of the P2P management server 200. However, the content location provision message includes only the content name, thus enabling the content request collection unit 150 to find out that the corresponding content is well-known content. Based on this, the content request collection unit 150 requests adjacent ultrapeers to provide the content.

Although the exemplary embodiments of the present invention have been explained in detail, the scope of the right of the present invention is not limited to them, and various modifications and improvements can be made by an ordinarily skilled person within the basic idea of the present invention defined in the following claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A peer device among a plurality of peer devices in a system for providing a content service to a user in conjunction with an end terminal and a peer-to-peer (P2P) management server, the peer device comprising:
   a content storage which receives content from the end terminal and stores therein the content together with the content name, and, upon receipt of the content name, searches the content corresponding to the content name and provide the content;
   a content request collector which collects a content name in response to a content request from the end terminal, and, upon receiving a content location provision message from the P2P management server, reports the content name to the content storage;
   a content name creator which creates a name for the content delivered from the end terminal;
   a P2P management server registrar which reports the content name created by the content name creation unit to the P2P management server and registers the content name; and
   a content provider which receives user-requested content from the content storage and provides the user-requested content, wherein if the corresponding content is not present in the content storage, the content provider provides the user with content received from an adjacent service providing device,
   wherein the peer device interfaces with the end terminal and separately interfaces with the P2P management server,
   wherein the P2P management server comprises a content location provider which is configured to transmit to the peer device the content location provision message indicating in which one of the plurality of peer devices requested content is located,
   wherein the peer devices are user-manipulated portable electronic devices,
   wherein the content storage, the content request collector, the content name creator, and the P2P management server registrar are provided in the peer device, and
   wherein, upon receiving a content provision request from the adjacent service providing device, the content storage provides the content to the adjacent service providing device.

2. The peer device of claim 1, further comprising:
   an end terminal information collector which collects terminal information containing specific information of the end terminal and uses the terminal information when the content name creator creates a name for the content.

3. A method for providing a content service to a user by a system in conjunction with an end terminal and a peer-to-peer (P2P) management server, the method comprising:
   at a peer hardware device among a plurality of peer hardware devices, receiving a request for content based on a content name input from a user;
   checking whether the content corresponding to the content name is stored or not;
   if the content is not stored, transmitting the content name to the P2P management server and requesting content location information;
   upon receiving the content location information from the P2P management server, sending a request for the content to an adjacent content providing device listed in the content location information; and
   receiving the content from the adjacent content providing device and providing the same to the user;
   before receiving the request,
      receiving content from the end terminal;
      creating a name for the received content; and
      storing the received content and the content name, and transmitting content
      information containing the content name and the ID of the content providing device to the P2P management server; and
   after requesting the content location information
      sending a request for the content to a service providing device; and
      receiving the content from the service providing device and providing the same to the user,
   wherein the peer hardware device interfaces with the end terminal and separately interfaces with the P2P management server,
   wherein the P2P management server comprises a content location provider which transmits to the peer hardware device the content location information indicating in which one of the plurality of peer hardware devices requested content is located,
   wherein the peer hardware devices are user-manipulated portable electronic devices.

4. The method of claim 3, wherein the content location information contains the content name and the ID of the content providing device having the content.

5. The method of claim 3, further comprising:
   after requesting the content location information, receiving transmission history information associated with the provision of the content name and the content.

* * * * *